April 17, 1945.    R. R. HART    2,373,757
CUSHION STOP
Filed March 27, 1944

Inventor
R. R. Hart
Attorneys

Patented Apr. 17, 1945

2,373,757

UNITED STATES PATENT OFFICE 2,373,757

CUSHION STOP

Roy R. Hart, San Jose, Calif.

Application March 27, 1944, Serial No. 528,184

3 Claims. (Cl. 30—271)

This invention is directed to, and it is an object to provide, an improved cushion stop or bumper; the device, while adaptable to many uses, being especially designed for use in connection with pruning shears or the like to cushion the shock which is otherwise imparted to the shear handles upon the shear blades reaching the limit of their closing movement.

A further object of this invention is to provide a cushion stop which may be readily applied to one handle of the shears in position to cooperate with the other handle thereof.

An additional object is to provide a cushion stop which includes a socket, and a socket supported resilient stop or bumper of novel construction; the socket and bumper being formed so that the bumper is securely held against accidental loss but can be easily replaced when worn.

It is also an object of this invention to provide a cushion stop, as above, wherein the resilient bumper is of such shape relative to the socket that when engaged and compressed said bumper does not deform over any edge or part of the socket, and which would cause injury to the bumper and require its frequent replacement.

A further object of the invention is to provide a simple and inexpensive device, and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
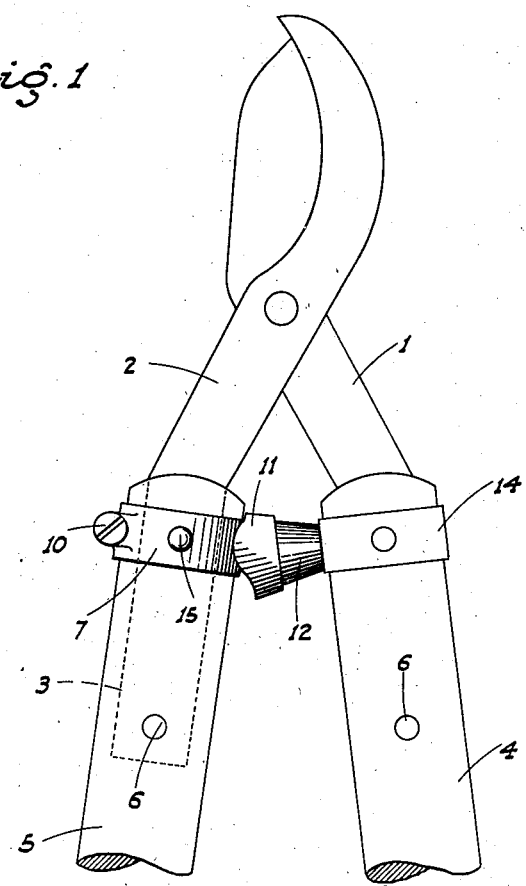
Figure 1 is an elevation of my improved cushion stop as applied to pruning shears.
Figure 2:
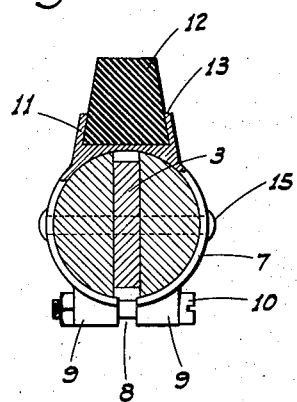
Figure 2 is an enlarged cross section on line 2—2 of Fig. 1.

Referring now more particularly to the characters of reference on the drawing, my improved cushion stop is here shown in connection with pruning shears which comprise a pair of intersecting blades 1 and 2 having flat shanks 3 which frictionally project into split sawed adjacent end portions of wooden handles 4 and 5; the shanks 3 being secured in the split sawed end portions of the handles 4 and 5 by means of cross rivets 6. The above is conventional shear construction and forms no part of the present invention.

The cushion stop which is the subject of this invention comprises an annular band 7 of substantial width and of bendable or resilient metal. The band 7 is split on one side as at 8, and on opposite sides of said split is formed with tangential bosses 9, through which bosses projects a securing and tensioning bolt 10.

At a point in diametrally opposed relation to the split 8 the band 7 is formed with an integral socket 11, said socket projecting in outwardly opening relation from the band and being tapered with the small end outermost. A solid or one-piece stop or bumper 12 of resilient material, such as rubber, is seated in the socket 11; said bumper 12 being of tapered or frusto-conical configuration, and matchingly seating in the socket 11 with a close frictional fit. The bumper 12 is formed on a straight taper so that it evenly and progressively decreases in diameter toward its outer end; the bumper projecting outwardly some distance beyond the rim 13 of the socket.

To apply the above described cushion stop to pruning shears the usual metallic retaining band adjacent the forward end of one of the handles is removed and the band 7 is slipped over said handle to a similar position. The band 7 is then adjusted to dispose the bumper 12 for engagement with the metallic retaining band 14 on the other handle. Thereafter the bolt 10 is tightened, which causes the band 7 to conform to and frictionally clamp about the handle. For a permanent installation a cross rivet 15 may be employed to lock the band 7 in connection with the corresponding handle and blade shank.

In order to assure face to face engagement of the bumper 12 with the band 14 on the other handle, the socket 11 may be canted slightly in a direction lengthwise of the implement handles.

Figure 3:
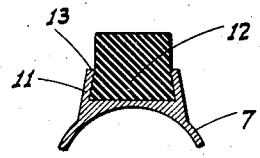
Figure 3 is a fragmentary cross section illustrating the resilient bumper as compressed.

In use, the bumper 12 engages the band 14 and cushions the shock of the blades 1 and 2 as the latter reach the limit of their closing movement; said bumper then compressing to the form shown in Fig. 3, wherein it is evident that there is no overlapping of the compressed bumper over the rim 13. By tapering the bumper as described, it does not tend to expand or bulge laterally of the rim 13, which would be undesirable as it would cause undue wear or cutting of said bumper. For the above reason the taper of the bumper is an important feature.

It should also be noted that in my improved cushion stop the bumper 12 is solid and there are no holes therethrough for connecting elements or the like, and which would weaken the bumper and cause it to wear out more rapidly than the bumper here employed. When the bumper 12 is worn and in need of replacement it can be sprung out of the socket and a new bumper pressed thereinto.

Figure 4:
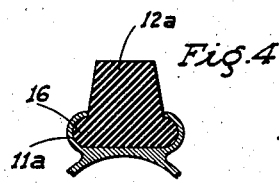
Figure 4 is a cross section for a modified form of bumper and mounting socket.

In Fig. 4 I show a modified form of bumper and socket, which provides better holding of the bumper and is particularly valuable when the socket must be shallow. In this case, the frusto-conical bumper 12a is formed with an enlarged base flange 16 of substantially semi-circular form in cross section, and which seats in a socket 11a of corresponding shape. In both types of the device, the important feature is the taper form of the bumper outwardly of the socket.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A cushion stop for pruning shears having a pair of handles secured to intersecting blades, said cushion stop comprising an annular band clampingly surrounding each handle adjacent its forward end, an outwardly opening socket fixed on one band in facing relation to the other band, and a solid but resilient bumper secured in and projecting from the socket for engagement with said other band upon closing of said shears.

2. In combination with pruning shears having a pair of handles secured to intersecting blades, of a cushion stop between the blades to cushion the shock when the handles are brought together during a cutting operation, such stop comprising a socket fixed to one handle, a frustro-conical resilient bumper being fitted in the socket and projecting toward the opposite handle and engageable by the latter as the handles tend to spring together under the stress of the cutting operation, the taper of the bumper and its length being such that when impacted and compressed by the handles such compression will not widen the tapered sides of the bumper beyond parallel relation.

3. A cushion stop for the purpose set forth which consists of a frustro-conical resilient bumper, an integral base element on the bumper, such base element being of greater diameter than the bumper at its base whereby to provide a projecting flange, such flange being substantially semi-circular in cross section, and a socket having substantially the same cross sectional shape as the flange and into which socket the flange is fitted, the frustro-conical bumper being of such length that when compressed in use such compression will not widen the tapered sides thereof beyond parallel relation.

ROY R. HART.